(12) United States Patent
Claeson et al.

(10) Patent No.: US 9,665,900 B1
(45) Date of Patent: May 30, 2017

(54) ITEM-SPECIFIC SALES RANKING SYSTEMS AND METHODS

(71) Applicant: Amazon Technologies, Inc., Reno, NV (US)

(72) Inventors: Jeremy Todd Claeson, Luxembourg (LU); Darshan Dev Bildikar, Karnataka (IN); Christopher Warren Bryant, Seattle, WA (US); Edward Charles Grenier, Seattle, WA (US); Samuel Stevens Heyworth, Seattle, WA (US); Sachin Midha, Delhi (IN); Balu Ramu, Karnataka (IN); Ambareesha Raghothaman, Karnataka (IN); Andrew Robert Toner, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 962 days.

(21) Appl. No.: 13/913,315

(22) Filed: Jun. 7, 2013

(51) Int. Cl.
*G06Q 30/00* (2012.01)
*G06Q 30/06* (2012.01)

(52) U.S. Cl.
CPC .................. *G06Q 30/0631* (2013.01)

(58) Field of Classification Search
CPC ............................... G06Q 30/0631
USPC ..................................... 705/26, 27
See application file for complete search history.

(56) References Cited

U.S. PATENT DOCUMENTS

| | | | |
|---|---|---|---|
| 6,963,850 B1 | 11/2005 | Bezos et al. | |
| 7,672,874 B2 | 3/2010 | Bezos et al. | |
| 7,827,055 B1 | 11/2010 | Snodgrass et al. | |
| 8,117,216 B1* | 2/2012 | Chanda | G06F 17/30991 707/737 |
| 8,145,512 B1 | 3/2012 | Henne et al. | |
| 2002/0174019 A1* | 11/2002 | Henderson | G06Q 30/02 705/26.4 |
| 2005/0004889 A1* | 1/2005 | Bailey | G06F 17/30864 |
| 2014/0052566 A1* | 2/2014 | Neidert | G06Q 30/06 705/26.7 |
| 2014/0180798 A1* | 6/2014 | Bailey | G06Q 30/0277 705/14.45 |

OTHER PUBLICATIONS

Tire Products by Vehicle, taken from webpage http://www.americastire.com, accessed on Mar. 21, 2013.

* cited by examiner

*Primary Examiner* — Rob Pond
(74) *Attorney, Agent, or Firm* — Knobbe, Martens, Olson & Bear, LLP

(57) ABSTRACT

Systems and methods herein can generate sales rankings for parts based on one or more metrics, such as geographic location of purchasers of the parts or based on items owned by users that function in conjunction with the parts. The systems can present the sales rankings to a user based on another item owned by the user. For example, sales rankings of memory can be presented to a user based on a laptop model owned by the user. Thus, users can determine how popular a part is among particular segments of the population, such as among users living in a certain geographic region, or among users who own a particular item designed to operate with the part. Moreover, the sales rankings can be used to generate recommendations of parts based on a corresponding item owned by the user that is configured to function with the part type.

26 Claims, 4 Drawing Sheets

ITEM-SPECIFIC SALES RANKING SYSTEMS AND METHODS

BACKGROUND

Various methods are used by e-commerce sites and systems to help customers locate products of interest. Some systems use market-based data to promote products. For example, an e-commerce site may identify or recommend to potential customers products that are best-selling or most popular among other customers, as determined from collected behavioral data. Some e-commerce systems recommend products based on what other customers with similar purchase or viewing histories have purchased.

Although these methods are sometimes useful, they ordinarily do not take into consideration the purpose for which customers purchased particular products.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

Figure 1:
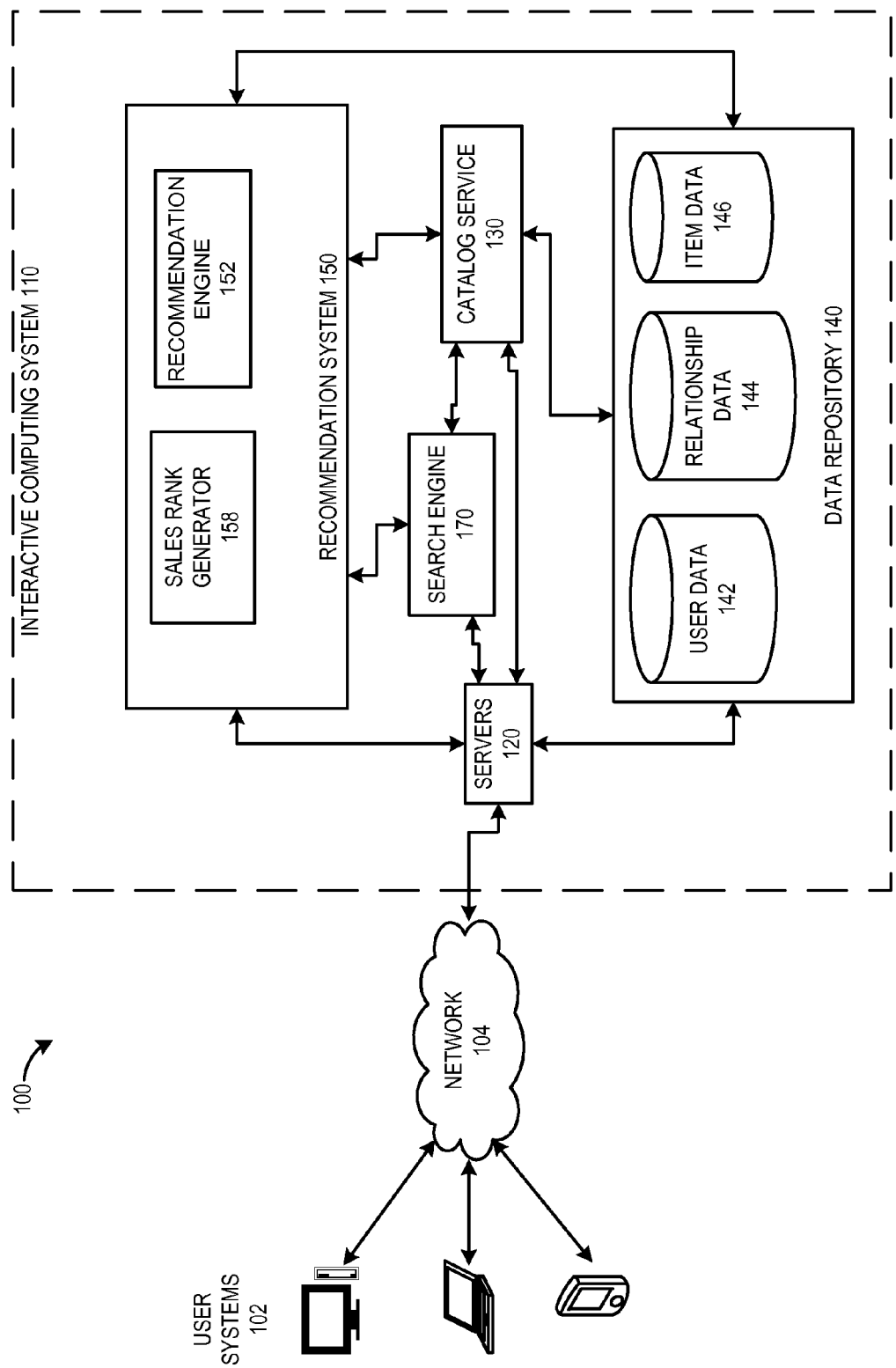
FIG. 1 illustrates an embodiment of a networked computing environment that can implement the features described herein in the context of an example interactive computing system.

A number of items that a user may purchase can be used in conjunction with items the user already owns, or to which the user has access. For example, users can purchase parts and/or accessories, such as ink cartridges and paper, for printers. As another example, users can purchase parts for their cars or other vehicles, such as tires, windshield wipers, brake pads, oil, rims, and the like. In yet another example, some electronic devices, such as laptops and smartphones, can be upgraded or accessorized. For instance, users can purchase additional or replacement memory for some electronic devices, protective covers, Bluetooth accessories, and the like.

One automated method that can be used to promote the sale of items is to generate and presents users with a sales ranking for items of a particular type. For example, a listing of all brake pads can be rank-ordered based on the number of sales for each brake pad model. The ranked listing may then be presented to a user who searches for or accesses catalog content related to brake pads. Likewise, memory for laptops can be rank ordered based on the number of sales for each memory model and presented to a user.

Ranking items by sales can, in some cases, help a user decide what brand or model of an item to purchase. However, for items that are used in conjunction with other items, sometimes the sales rankings can be misleading. For example, assume both parts A and B can be used by both items Y and Z. Further, assume that users have purchased 100 instances of part A and 110 instances of part B. Overall, part B is a better selling item than part A (110>100). However, further assume that owners of item Y purchased 90 of the instances of part A and 10 instances of part B, and owners of item Z purchased 10 instances of part A and 100 instances of part B. Even though part B had better overall sales than part A, part A sells better among owners of item Y.

In some embodiments, additional item correlations may be used to facilitate part purchases. For instance, continuing the above example, assume that parts C and D can both be used by item Y and are of a different part type than parts A and B (e.g., parts A and B may be tires, parts C and D may be wheels, and items Y and Z may be cars). If the majority of owners of item Y who also own part C purchase part A and the majority of owners of item Y who also own part D instead purchase part B, different sales rankings may be presented to a user depending on whether the user owns the item Y part C combination or the item Y part D combination. As a more concrete example, an owner of a TOYOTA® vehicle with 16" wheels may be recommended GOODYEAR® 16" all-season tires as the number one selling tire for such a vehicle. However, an owner of a TOYOTA vehicle with 15" wheels may be recommended FALKEN® 15" all-season tires as the number one selling tire for a TOYOTA vehicle with the smaller wheels. The hierarchy of correlated parts can be extended to any number of additional parts that can function with item Y. Thus, for example, tires may be ranked based on sales for owners of vehicle Y who own 15" wheels, and have spinning rims.

Some embodiments of the present disclosure include systems and methods for generating sales rankings of items, such as parts or accessories, based, at least partially, on additional items that are configured to use (or be used with) these items. Systems herein can determine one or more item categories for an item or part type. The systems can generate sales rankings for the models of the part type based on the item categories. These item categories can be based on characteristics of the part types as well as items that are configured to use models of the part type. For example, item categories for tires can be based on car brands that use the tires, car models that use the tires, a combination of car models and model year for cars that use the tire, etc. As another example, an item category can be based on the average use-life for a car headlight, the brightness of a car headlight, etc.

Further, in at least some embodiments, the systems can present sales rankings of items or parts of a part type to a user based on a corresponding item owned by the user that can be used with the part type. For example, sales rankings of memory can be presented to a user based on a laptop model owned by the user. Moreover, in some cases, the sales rankings can be used to generate recommendations of items of an item or part type for a user based on another item owned by the user that can use (or be used with) the part type.

As used herein, the term "item" is used interchangeably to refer to an item itself (e.g., a particular product) and to its description or representation in an electronic catalog system. As will be apparent from the context in which it is used, the term is also sometimes used herein to refer only to the item itself or only to its representation in the catalog system. Further, as used herein, the term "part" may include, without limitation, an item, a component, an accessory or anything else that may be used with another item or may be a replaceable piece of the other item.

As one non-limiting example, the disclosed processes may be embodied in an interactive system (e.g., web site or mobile-application-based sales system) that hosts an electronic catalog of auto parts. The system may record, in connection with particular customer accounts, information about the cars or other vehicles owned by particular customers. When a customer requests catalog content associated with a particular fitment-specific product (e.g., wiper blades), the system may personalize the catalog content with information regarding the popularity or sales rank of the product among owners of the same or similar vehicles. This information may be presented at various levels of granularity. For example, if an owner of a 2010 TOYOTA CAMRY® Hybrid car accesses a product detail page for a particular wiper blade product, the page may be personalized with an indication of the product's sales rank (or some other popularity metric) among some or all of the following customer segments: (1) owners of 2010 TOYOTA CAMRY Hybrid cars, (2) owners of 2010 TOYOTA CAMRY cars, (3) owners of TOYOTA CAMRY cars, (4) owners of vehicles for which this wiper blade product is configured to be used, and/or (5) all customers. The system may also generate auto part recommendations for customers based (or based in part) on the same or similar customer-segment-specific popularity metrics.

Example Networked Computing Environment

FIG. 1 illustrates an embodiment of a networked computing environment 100 that can implement the features described herein in the context of an example interactive computing system 110. The interactive computing system 110 can generally represent a network application, such as a web application or website, for identifying product attributes and features, and for recommending and selling products or items to a user. Further, the interactive computing system 110 may be configured to mine sales data to generate sales rankings of items based on one or more item-categories, which may be based on the item itself, an additional item that uses the item (e.g., if the item is a tire, the additional item may be a car or a bicycle), or a combination of the same. In some embodiments, the interactive computing system 110 is associated with a network or Internet-based store or retailer. In some cases, the interactive computing system 110 may be associated with an Internet-based store that is affiliated with a brick-and-mortar store or retailer. The network 104 may include any system for allowing multiple computing devices to communicate with each other. For example, the network 104 can be a Local Area Network (LAN), a Wide Area Network (WAN), a wireless network, a satellite network, a cable network, a cellular network, the Internet, combinations of the same, or the like.

The interactive computing system 110 can include a number of systems that facilitate implementing the processes described herein. In the depicted embodiment, the interactive computing system 110 includes several components that can be implemented in hardware and/or software. For instance, the interactive computing system 110 can include one or more servers 120, which may be implemented in hardware, for receiving and responding to network requests from user systems 102. However, some of the capabilities of the servers 120 may be implemented in software. The one or more servers 120 can include web servers, application servers, database servers, combinations of the same, or the like.

Further, the interactive computing system 110 may include a search engine 170, which may be implemented in hardware and/or software. The search engine 170 can include any system for searching an electronic catalog. For example, the search engine 170 can search an electronic catalog provided by the catalog service 130. Both the search engine 170 and the catalog service 130 may be in communication with the servers 120. Users can browse an electronic catalog provided by the catalog service 130 or query the search engine 170 to obtain information about electronic catalog content stored in an item data repository 146.

The electronic catalog content can include information about items or products, and/or services. In one embodiment, this content is arranged in a hierarchical structure, having products or items associated with one or more categories or browse nodes in a hierarchy. The catalog service 130 can provide functionality for users to browse the product hierarchy in addition to searching the catalog via the search engine 170.

In some cases, the hierarchical structure can include a tree-like structure with browse nodes that are internal nodes and with browse nodes that are leaf nodes. The internal nodes generally include children or descendent nodes and the leaf nodes generally do not include children nodes. The internal nodes may be associated with a product or item category or classification, which can include sub-classifications. The sub-classifications may represent additional internal nodes or leaf nodes. The leaf nodes may be associated with a product or item category or classification that does not include sub-classifications. In some implementations, the internal nodes are associated with product classifications and sub-classifications, but not items or products, and the leaf nodes are associated with the items or products. In other implementations, both the internal nodes and leaf nodes may be associated with items or products.

Users can select an item or product represented in the hierarchy or in a list of search results to see more details about the product. In response to a user's product selection, the server 120 can provide to a user system 102 a catalog page (sometimes called an item or product detail page) that includes details about the selected product. Alternatively, or in addition, the server 120 can provide information about the item or product's ranking with respect to sales. This sales ranking may be for all sales, sales with a time period, sales with respect to another item that uses the item in question, and combinations of the same, or the like. In some cases, sales used to generate the rankings may be weighted based, for example, on the recentness of the sale.

The interactive computing system 110 can also include a recommendation system 150. The recommendation system 150 can generally include any system for recommending one or more products to a user associated with the user systems 102. The recommendation system 150 may recommend a product in response to a request from a user or from an administrator associated with the interactive computing system 110. In one embodiment, the recommendation system 150 may recommend an item automatically without receiving a user request. In some cases, the recommendation system 150 may recommend a product to a user in response to a passage of time since a previous purchase by the user. Further, the recommendation system 150 may be used to present a user with a sales ranking for an item type. In some cases, the recommendation system 150 may explicitly recommend an item of the item type based on the sales ranking of the items of the item type. Alternatively, the recommendation system 150 may implicitly recommend a particular item of the item type by presenting the sales ranking to a user. In other words, by presenting the sales ranking for an item type to a user, an implicit recommendation may be made to purchase the item that is ranked the highest (e.g., has garnered the most sales within a time period).

The recommendation system 150 includes a number of components that facilitate the recommendation system 150 providing recommendations to users and/or presenting sales ranks to users. Alternatively, one or more of the components may be separate from the recommendation system 150. In the depicted embodiment, the components can include a recommendation engine 152 and a sales rank generator 158. The recommendation system 150 can be implemented in hardware and/or software. Further, one or more of the components of recommendation system 150 can be implemented in hardware and/or software.

The recommendation engine 152 can determine one or more items to recommend to a user. In some embodiments, these items may be identified based on sales rankings for the item type. Further, the items may be identified based on sales rankings that are particular to or related to specific item categories, which may be identified based on another item that uses the item. In certain cases, items or parts may be fitment-specific, or configured to function with particular products. These fitment-specific products may not function, or may not function as effectively with other products of a similar type as the products designed to use the fitment-specific products. One example of such a fitment-specific part is tires. Although automobiles use tires, not all automobiles can use the same type of tires. Tires may be ranked by total sales, which may be an effective measure of the popularity of a tire for popular vehicles or vehicles that use common tire sizes, but less effective for less commonly used tire sizes. Alternatively, or in addition, tires may be ranked based on total sales for specific vehicles. Advantageously, in certain embodiments, by ranking tires based on sales for a particular vehicle, tires with relatively low sales because, for example, the tire fits a small number of vehicles, may be ranked higher than when compared to total tire sales, thereby enabling tires designed for vehicles with lower sales to be more prominently displayed or advertised to owners of these vehicles. In some cases, this may help improve sales of specialty tires, or fitment-specific tires designed for cars that are sold in lower quantities.

As a more concrete example, consider a situation where 100 owners of vehicle A and 10 owners of vehicle B have all purchased part X (which fits both vehicles A and B), while 10 owners of vehicle A and 90 owners of vehicle B have all purchased part Y (which fits both vehicles A and B), part X will have a higher sales rank than part Y (since 110>100). As a result, in some cases, part X will be featured more prominently to owners of vehicle B, even though these customers might have more interest in part Y. However, by using a vehicle specific sales ranking, owners of vehicle B will be presented or recommended part Y since owners of vehicle B tend to purchase part Y over part X despite part X having more overall sales. Further, as previously described, the vehicle specific sales rankings may be based, at least in part, on additional parts owned by the owners of the vehicles. Thus, although owners of vehicle B may purchase part Y more often than part X, if owners of vehicle B who own part W purchase part X more often than part Y, a user who owns vehicle B with part W may be recommended part X despite part Y being more popular overall for owners of vehicle B.

The sales rank generator 158 can generate the sales rankings for the items. These sales rankings can be based on different item categories associated with the items based on products capable of using the items. For instance, the sales rank generator 158 can create a sales ranking for total sales of an item type (e.g., windshield wipers), a sales ranking for items of the item type that fit a particular class of vehicles (e.g., sedans), a sales ranking for items of the item type that fit a particular vehicle (e.g., NISSAN® ALTIMA® vehicle), etc. Further, in some cases, the sales rank generator 158 can update sales rankings for item types over time. As more items are sold, the rankings may be updated. Moreover, in some cases, sales of particular items may be weighted differently over time so that, for example, older sales have less impact on sales rankings than newer sales. In some embodiments, sales ranks may be generated based on a portion of sales of a part made by users who own an item that can be used in conjunction with the part. For example, if 100 instances of a part A are sold, and 10 instances are purchased by CAMRY vehicle owners, then the ranking for the part purchased by CAMRY vehicle owners could be 10/100. Similarly, if 5 instances are purchased by 2010 CAMRY vehicle owners, then the sales ranking could be 5/100 for 2010 CAMRY vehicle owners. Alternatively, sales ranks may be based on the percentage of sales encompassed by a part model for a part type bought by owners of an item (e.g., vehicle) that uses the part. For instance, if 2010 CAMRY vehicle owners bought 100 windshield wipers and 10 of them are part A, 10 of them are part B, and 5 of them are part C, then parts A and B would rank ahead of part C since parts A and B make up a greater percentage of sales. However, parts A and B would be ranked the same as they make up the same percentage of sales. Several examples of sales ranking methods that may be implemented by the sales rank generator 158 are described in U.S. application Ser. No. 09/809,728, filed on Mar. 15, 2001 and titled "INCREASES IN SALES RANK AS A MEASURE OF INTEREST," the disclosure of which is hereby incorporated in its entirety by reference herein.

In some embodiments, the sales rank generator 158 may comprise a popularity metric generator. In such cases, the sales rank generator 158 may generate rankings based on one or more popularity metrics. These popularity metrics can include any type of metric that can correspond to the popularity of a part. For example, the popularity metric may include quantity sold, customer rating, customer rankings, item reviews, number of times an item-detail page for a part is shared (e.g., via email, a microblog posting, a social network posting, etc.), etc. Further, in some cases, the popularity metric may include or be based on sales velocity, which can relate to an increase or decrease in a rate of sales for a part over a time period. Some example embodiments of using sales velocity with sales rankings are described in more detail with respect to the U.S. application Ser. No. 09/809,728 incorporated by reference above.

The data repository system 140 can generally include any repository, database, or information storage system that can store information associated with items and users. This information can include any type of data including: product descriptions, account information, customer reviews, item tags, sales information, or the like. Further, this information can include relationships between products, between users, and between products and users.

The data repository 140 can include a user data repository 142, a relationship data repository 144, and an item data repository 146. The user data repository 142 can store any information associated with a user including account information, user purchase information, user demographic data, product view information, user searches, identity of products owned by a user (e.g., purchased or obtained as a gift) or the like. Further, the user data repository 142 can store information about items owned by the user. For example, the user data repository 142 may include information relating to vehicles owned or otherwise accessible (e.g., leased) by a user. This information may be obtained from the user by requesting the user provide the information. Alternatively, or in addition, the information may be obtained by mining user purchases. For instance, if a user purchases a tire or a headlight that fits HONDA® vehicles, the interactive computing system 110 may determine that the user owns a HONDA vehicle. Further, the interactive computing system 110 may request that the user confirm that the user owns a HONDA vehicle and/or request that the user identify what model HONDA vehicle the user owns.

The item data repository 146 can store any information associated with an item or product. For example, the item data repository 146 can store product descriptions, customer reviews, product tags, manufacturer comments, etc.

The relationship data repository 144 can store any information that relates one item to another item. For example, the relationship data repository 144 can include information identifying items that can be used by other items (e.g., tires that can be used by particular model cars, ink cartridges that can be used by particular model printers, etc.), items first available in a specific year, items that share a classification, or items that share a sales ranking (e.g., items on top ten sales list by volume and/or by monetary sales numbers).

The user systems 102 can include any computing system or device that can communicate with the interactive computing system 110 via the network 104. These computing systems can generally include any computing device(s), such as wireless mobile devices (e.g. smart phones, PDAs, tablets, or the like), desktops, laptops, video game platforms, electronic book readers, television set-top boxes, televisions (e.g., internet TVs), and computerized appliances, to name a few. Further, the user systems 102 can include any type of software (such as a web browser or a mobile shopping application) that can facilitate communication with the interactive computing system 110.

Example Item-Specific Sales Ranking Process

Figure 2:
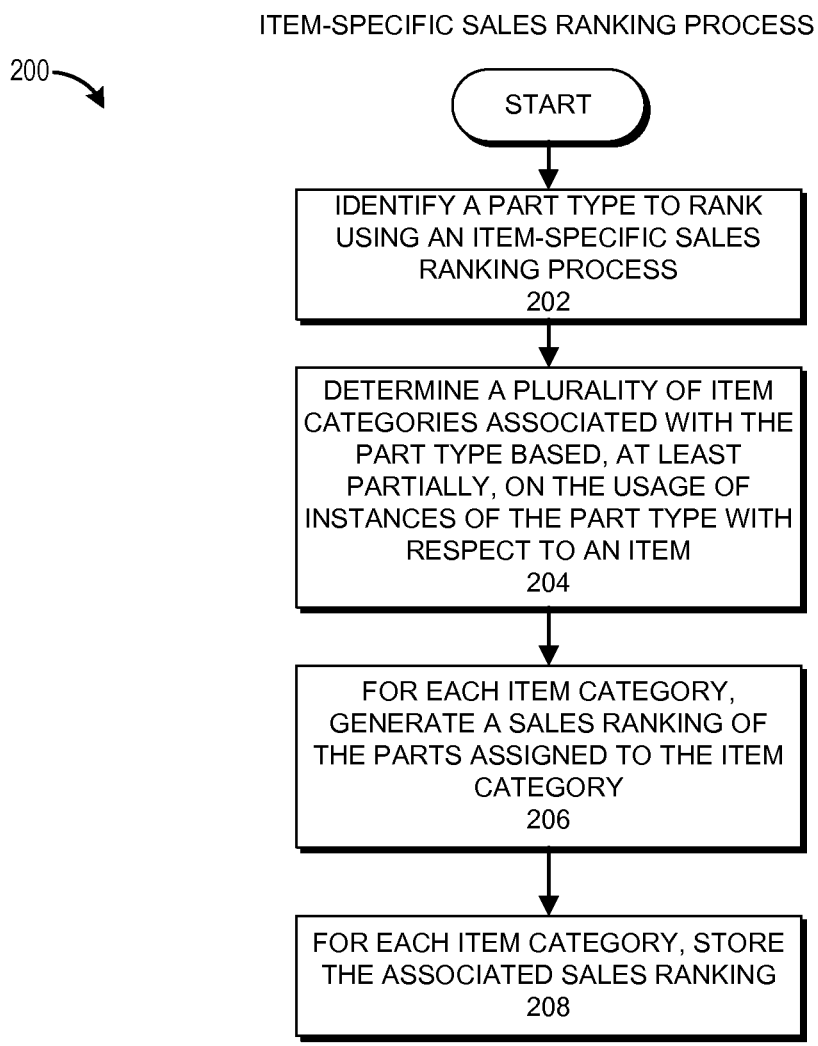
FIG. 2 illustrates a flow diagram for one embodiment of an item-specific sales ranking process.

FIG. 2 illustrates a flow diagram for one embodiment of an item-specific sales ranking process 200. The process 200 can be implemented by any system that can generate item specific sales-rankings. For example, the process 200, in whole or in part, can be implemented by the interactive computing system 110, the servers 120, the recommendation system 150, the recommendation engine 152, and the sales rank generator 158, to name a few. Although any number of systems, in whole or in part, can implement the process 200, to simplify discussion, the process 200 will be described with respect to particular systems.

The process 200 may be performed on command or automatically. In some cases, the process 200 may be performed at set time intervals or on a repeated schedule. In other cases, the process 200 may be performed continuously. Moreover, the process 200 may be triggered in response to a sale of a part or an item.

The process 200 begins at block 202 where, for example, the sales rank generator 158 identifies a part type, or an item type, to rank using an item-specific sales ranking process. The part type may be specified by a user (e.g., an administrator). Alternatively, or in addition, process 200 may be used for a subset of item types (e.g., all parts in the automotive category, or all parts in the computer category) or for each item type within an electronic catalog provided by, for example, the catalog service 130. Further, as stated above the process 200 may be triggered in response to the sale of a part or an item of the part type. Moreover, the process 200 may be triggered in response to a popularity metric action, such as a customer review of a part, or an increase in the rate of sales for a part over a time period.

At block 204, the sales rank generator 158 determines a plurality of item categories associated with the part type based, at least partially, on the usage of instances of the part type with respect to an item. For example, an item category may exist or may be created for a group of items of the part type that may be used by another item. As a more concrete example suppose that the part type identified at the block 202 is car tires. The car tires may be associated with a plurality of item categories based on the types of cars that can use subsets of the car tires. Thus, an item category may exist for NISSAN cars, another item category may exist for NISSAN ALTIMA cars, another item category may exist for NISSAN MAXIMA® cars and yet another item category may exist for model year 2010 NISSAN ALTIMA cars. Each of these item categories are for the tires part type. However, at least some of the item categories may include different tire models then the remaining item categories based on the item, which in this example are cars, used to define the item categories.

In some cases, the item categories may be determined based on browse nodes. For example, a different browse node may exist for tires that fit a NISSAN ALTIMA vehicle versus tires that fit a NISSAN MAXIMA vehicle. However, the tires for both the NISSAN ALTIMA vehicle browse node and the NISSAN MAXIMA vehicle browse node may be associated with a browse node that includes tires for a NISSAN vehicle.

Alternatively, item categories may be determined based on defined rules, such as rules defined by an administrator. These rules may be based on characteristics of the part models for a part type and/or may be based on the characteristics of the items that are configured to use the part type, or a subset of part models of the part type. In some cases, the item categories may be defined based on characteristics of parts of the part type. For instance, assuming the part type is for tires, one item category may be for 15 inch rim tires, one item category may be for all-weather tires, and one item category may be for low-profile tires.

At block 206, the sales rank generator 158, for each item category identified at the block 204, generates a sales ranking of the parts assigned to the item category. The sales ranking may be generated using any sales ranking process, such as those described in U.S. application Ser. No. 09/809,728, which was incorporated in its entirety by reference above. For example, the sales ranking may be generated based on sales over time since each part or item assigned to the item category was made available for sale by an entity associated with the interactive computing system 110. Alternatively, the sales ranking may be generated based on sales over a period of time selected by a user (e.g., an administrator). In some cases, the period of time may be based, at least partially, on the part type. For instance, part types that are replaced less frequently may have a longer sales rank time period for measuring a quantity of sales than part types that are replaced more frequently. In some cases, the sales ranking may be based on weighted sales. For instance, more recent sales may be weighted more than older sales. In such cases, an item with less total sales may be ranked higher than an item with more total sales depending on the recentness of the sales.

The sales rank generator 158, at block 208, stores for each item category the associated sales ranking generated at the block 206. The sales rankings may be stored at the data repository 140. For example, each item category's sales rank may be stored at the relationship data repository 144. Advantageously, in certain embodiments, by storing sales rankings at a data repository 140, the recommendation engine 152 can generate recommendations for a part based on a corresponding item owned by a user that makes use of the part by accessing sales rankings for the part type of the part with respect to the item. In other words, as an example, supposing the user owns a particular car, the recommendation engine 152 can access sales rankings for tires that fit the particular car to facilitate generating a recommendation for replacement tires specific to the particular car.

As previously indicated, the sales rankings may be calculated, or re-calculated, in response to one or more sales of an item or part. Further, as previously indicated, the item categories for generating the different sales rankings may be based on items that are used in conjunction with the purchased item or part.

However, since multiple items or models of an item may be configured to use a particular part, the item for which the part was purchased may need to be identified to update some of the sales rankings. This can be accomplished by requesting that the user identify the item for which the part is being purchased (e.g., is the tire being purchased for a TOYOTA CAMRY vehicle or a TOYOTA SIENNA® vehicle?). This information may be stored with an account associated with the user to facilitate generating sales rankings for future purchases.

Alternatively, or in addition, the item owned by the user may be determined based on past purchases. For example, if a user is purchasing ink for a printer, and the user bought the printer from the same organization as the ink, the user data repository 142 may store the user's printer purchase and the sales rank generator 158 may determine that the purchased ink is for the previously purchased printer. In such cases, the sales rank generator 158 may update sales rankings for item categories associated with the printer. For example, the sales ranking generator 158 may update sales rankings of ink for the printer brand and/or for the printer model. In certain embodiments, the sales generator 158 may deduce an item owned by the user based on prior purchases of parts. For example, if a certain ink cartridge is fitment-specific to a particular brand and/or model of printer, the sales generator 158 may deduce that the user owns the particular model of printer even if the printer was purchased elsewhere.

In some cases, a user may own multiple items that can be used in conjunction with another item or part. For example, the same size windshield wiper may be usable with both a TOYOTA CAMRY vehicle and a HONDA ACCORD vehicle. If the user owns both an ACCORD vehicle and a CAMRY vehicle, it may not be possible to update the sales ranking of the windshield wiper the user purchases. In such cases, the purchase of the windshield wiper may be disregarded for determining a sales ranking of windshield wipers for CAMRY vehicles and ACCORD vehicles. However, the purchase may be used to update the sales ranking for windshield wipers generally and/or for windshield wipers usable with sedans, or for any other item category that may be identified based on a characteristic shared by both the CAMRY vehicle and ACCORD vehicle. If it can be determined for which car the user purchased the windshield wiper (e.g., the user identifies that the purchase is for the ACCORD vehicle and not the CAMRY vehicle), then the sales rank generator 158 can update the sales ranking of the windshield wiper for the identified car item category (e.g., the ACCORD vehicle) and not for the other vehicle owned or leased by the user (e.g., the CAMRY vehicle). In some cases, the sales generator 158 can identify which item the part was purchased for based on another purchase. For instance, although both the TOYOTA CAMRY vehicle and the HONDA ACCORD vehicle may use the same size wiper for the driver's side, the CAMRY vehicle and ACCORD vehicle may use different size wipers for the passenger side. In such cases, it may be determined which vehicle the user is purchasing windshield wipers based on the passenger side wiper. Further, in some cases, the vehicle may be identified using multi-factor correlation. For instance, although the same size wiper may fit two different vehicles, it may be possible that the wiper fits the blade frame for only one of the vehicles.

Although the process 200 has been described with respect to sales rankings, the process 200 is not limited as such. The process 200 may be used for any type of rankings. For example, the process 200 may be used to rank item parts based on user or customer rankings associated with an item and/or an item category. Thus, for example, supposing a user owns a vehicle A that uses tires of size Z, the tires of size Z may be presented to the user in order by ratings of the tires by other users who also own vehicle A. Similarly, a user who owns a vehicle B that also uses tires of size Z may be presented with a list of tires of size Z presented to the user in order by ratings of the tires by other users who also own vehicle B. The two rankings may differ as owners of vehicle A may rate the different size Z tires differently than owners of vehicle B.

Example Item-Specific Recommendation Process

Figure 3:
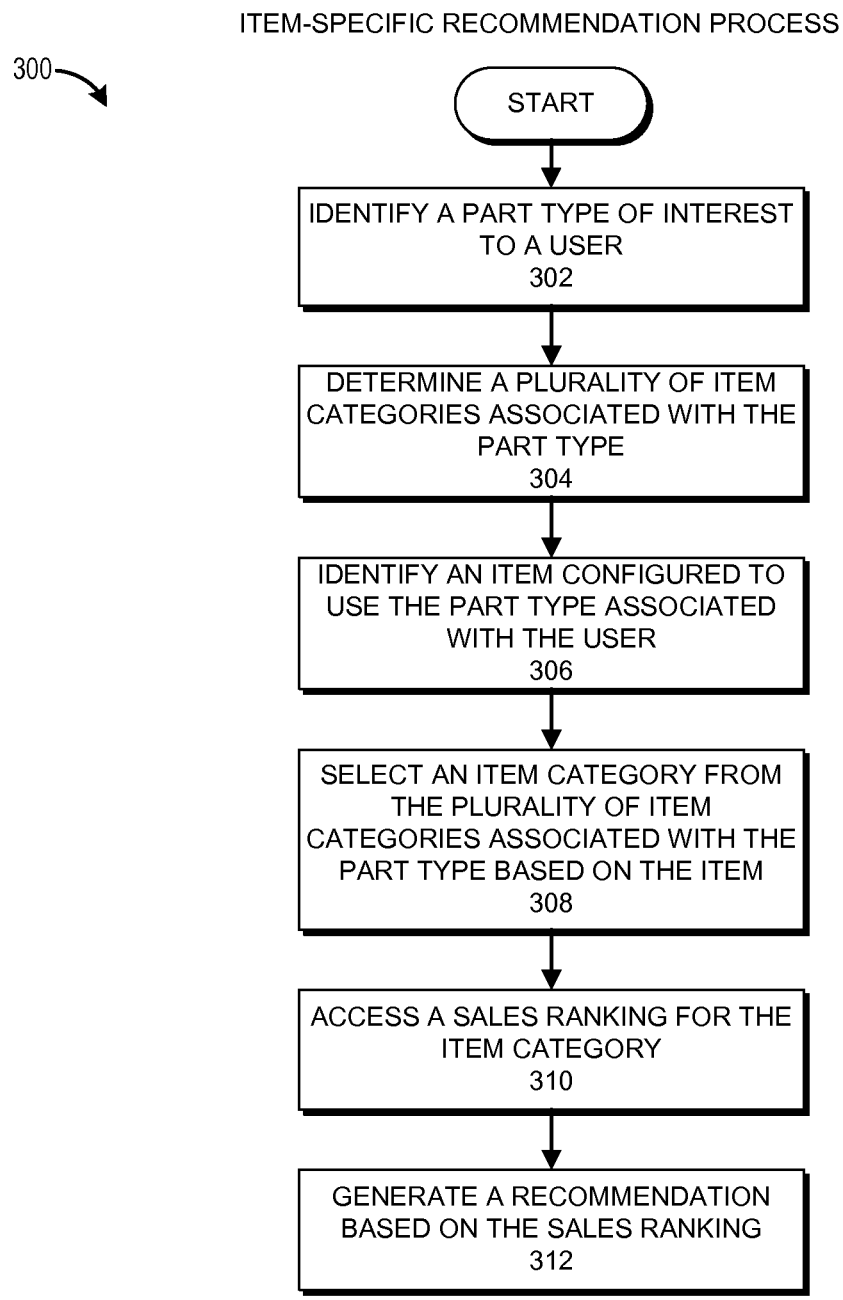
FIG. 3 illustrates a flow diagram for one embodiment of an item-specific recommendation process.

FIG. 3 illustrates a flow diagram for one embodiments of an item-specific recommendation process 300. The process 300 can be implemented by any system that can recommend items or parts to a user based on the sales numbers or rankings of the items or parts with respect to a corresponding item configured to use the recommended item that is owned or accessible by the user. For example, the process 300, in whole or in part, can be implemented by the interactive computing system 110, the servers 120, the recommendation system 150, the recommendation engine 152, and the sales rank generator 158, to name a few. Although any number of systems, in whole or in part, can implement the process 300, to simplify discussion, the process 300 will be described with respect to particular systems.

The process 300 begins at block 302 where, for example, the recommendation engine 152 identifies a part type of interest to a user. The recommendation engine 152 may identify the part type of interest based on a search performed or requested by a user, based on items viewed, purchased, or selected by the user, and combinations of the same, or the like. Further, in some cases, the part type may be identified based on a specific item of interest to a user, or based on the user identifying the part type of interest. For example, the user may identify a specific model printer ink cartridge of interest, or the user may indicate interest in printer ink cartridges in general. In either case, printer ink cartridges may be identified at the block 302 as the part type of interest or relevance for performing the remainder of the process 300.

In some cases, the part type may be identified based on the output of one or more recommendation algorithms used to identify items to recommend to a user. In such cases, the part type identified at the block 302 may or may not be a part type of interest to the user, but may instead be a part type that may probabilistically be of interest to the user based on the inputs to the recommendation algorithms.

At block 304, the recommendation engine 152 determines a plurality of item categories associated with the part type. The item categories may be based on browse nodes in an item hierarchy. Further, the item categories may be based on one or more characteristics of parts or items associated with the part type including, in some cases, characteristics of other items configured to use the parts associated with the part type. For example, the item categories may be based on the model or brand of the parts of the part type, the year of manufacture or the model year of the parts of the part type, size of the parts, ratings for the parts, colors of the parts, etc. Similarly, the item categories may be based on the model or brand of the items configured to use the parts of the part type, the year of manufacture or the model year of the items configured to use the parts of the part type, size of the item configured to user the parts, etc.

The recommendation engine 152 identifies an item associated with the user that is configured to use the part type, or at least some parts associated with the part type at block 306. For example, the recommendation engine 152 may identify a printer owned by the user if the part type identified at the block 302 is an ink cartridge. As a second example, the recommendation engine 152 may identify a car or other motor vehicle owned by the user if the part type is a tire, battery, headlight, or other type of part that may be used with a motor vehicle. The item may be identified by accessing user data stored at the user data repository 142. This user data may be obtained from purchases made by the user from an e-commerce store hosted by the interactive computing system 110. Alternatively, or in addition, the item associated with the user may be identified by querying the user and/or based on information provided by the user. Generally, the item associated with the user is an item owned by the user. However, in some cases, the item may be an item accessible by the user, which may or may not be owned by the user. For example, the item may be a vehicle leased by the user. In some cases, the item may be owned by another user. For example, the user may identify the item at the block 306 to enable the recommendation engine 152 to recommend a gift associated with the item. For example, a user may desire to purchase car tires for a car owned by the user's child. In such a case, the user may provide the identity of the car to an e-commerce site associated with the interactive computing system 110. The recommendation engine 152 can subsequently recommend a set of car tires to the user that is compatible with the identified car.

At block 308, the recommendation engine 152 selects an item category from the plurality of item categories associated with the part type based on the item identified at the block 306. For example, if the item identified at the block 306 is a 2010 NISSAN ALTIMA vehicle and the part type identified at the block 302 is a brake light, the item category selected at the block 308 may include brake lights that fit a NISSAN ALTIMA vehicle or brake lights for a 2010 NISSAN ALTIMA vehicle. In some cases, at least some of the brake lights may also fit other vehicles.

At block 310, the recommendation engine 152 accesses a sales ranking for the item category selected at the block 308. The recommendation engine 152 may access the sales ranking from the data repository 140. Alternatively, or in addition, the recommendation engine 152 may use the sales rank generator 158 to generate a sales ranking for the item category. In some embodiments, if the sales numbers for the parts included in the selected item category are below a threshold, the recommendation engine 152 may select a different item category. For example, if the 2010 NISSAN ALTIMA item category does not include brake lights with sales or cumulative sales beyond a threshold, the recommendation engine 152 may instead select an item category that includes more sales information, such as the NISSAN ALTIMA item category, which may include NISSAN ALTIMA vehicles from multiple years. In some cases, the item category may be further filtered to include parts that fit the user's item. Thus, continuing the above example, the item category may be filtered to include NISSAN ALTIMA vehicles for years that use the same type of brake light as the 2010 NISSAN ALTIMA vehicle.

The recommendation engine 152, at block 312, generates a recommendation based, at least in part, on the sales ranking accessed at the block 310. This recommendation may further be based on additional information, such as item ratings, user preferences, user ratings, etc. The recommendation can be presented to the user via any process for providing recommendations. For example, the recommendation may be provided via email, text message, on an item-detail page for an item the user is viewing, in a pop-up window, etc.

Alternatively, or in addition, to generating the recommendation at the block 312, the recommendation engine may present the sales ranking of parts or items of the part type that are included in the item category selected at the block 308. The sales ranking may be presented in response to a search query, on an item-detail page for an item the user is viewing, via email, or any other method for presenting a sales ranking to a user. In some embodiments, multiple sales rankings may be presented to the user. For example, a sales ranking may be presented for all items of a part type and for items of a part type included in the item category selected at the block 308. An example user interface for presenting sales rankings is described in more detail below with respect to FIG. 4.

Example Electronic Catalog Search Page

Figure 4:
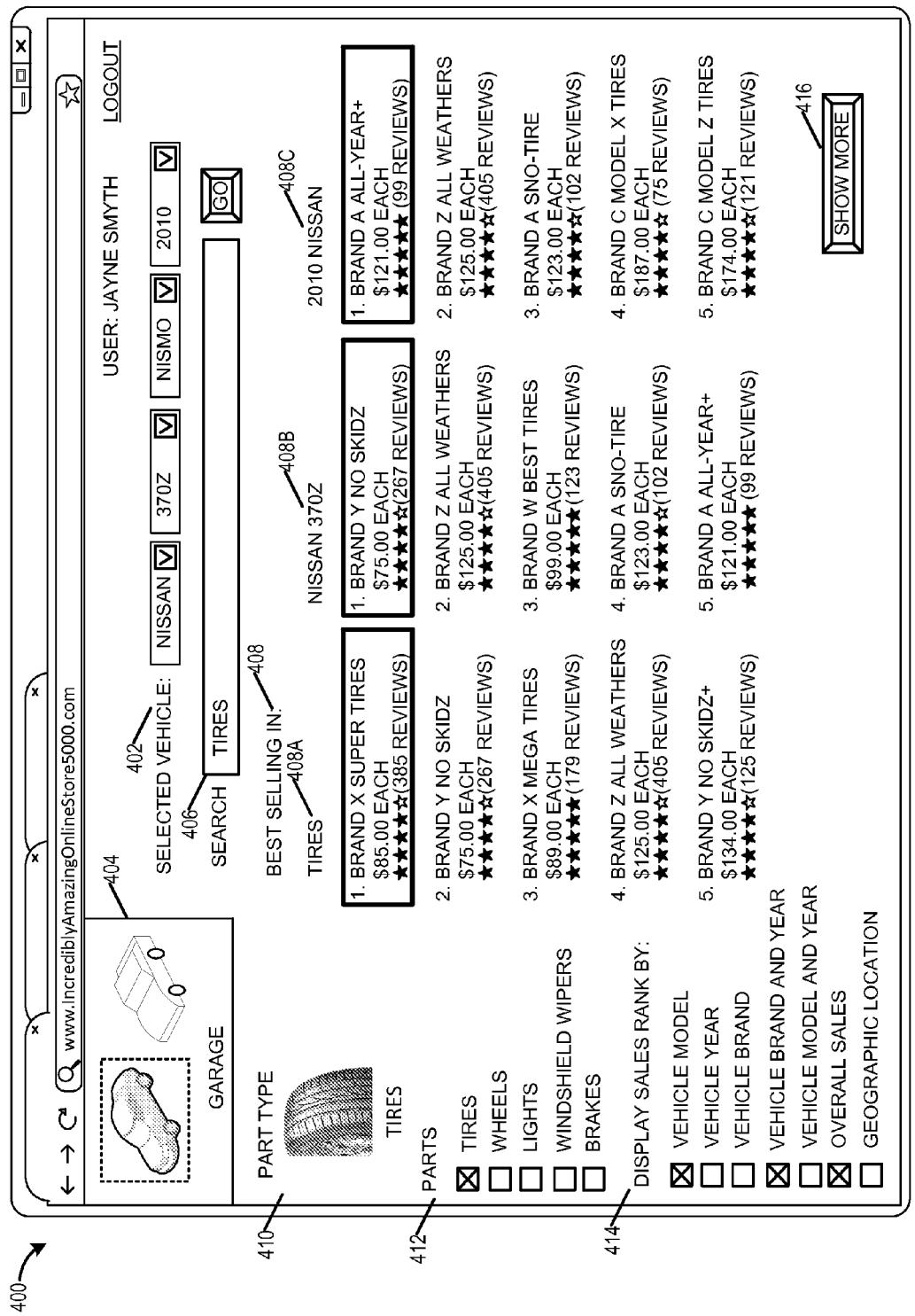
FIG. 4 illustrates an embodiment of an electronic catalog search page with category-specific sales ranking information.

FIG. 4 illustrates an embodiment of an electronic catalog search page 400 with category-specific sales ranking information. The electronic catalog search page 400 is one non-limiting example of a search page that can present items or parts to a user. Although the example illustrated in FIG. 4 presents a search page for finding vehicle parts, as previously described, the teachings of the present disclosure may be applied to other types of parts and items. For example, the electronic catalog search page 400 may be used to search for ink cartridges for a printer, memory for a computer, etc.

A user may access the electronic catalog search page 400 using a browser. Alternatively, or in addition, the user may access the electronic catalog search page using an application or app from, for example, a mobile computing device.

In the example of FIG. 4, the electronic catalog search page 400 can include one or more input fields 402 (e.g., drop down boxes, text fields, etc.) for specifying a vehicle. Alternatively, if the user is logged into a user account at the e-commerce site associated with the electronic catalog search page 400, the user can select a vehicle previously identified to the e-commerce site by selecting the vehicle from the user's garage widget 404. As illustrated in FIG. 4, the garage widget 404 may include multiple vehicles and the active vehicle may be highlighted as indicated by the dashed line box surrounding the left-most car.

Using a search field 406, a user can search for parts for the user's selected vehicle. The results of the search may be presented as one or more sales ranking lists 408. For example, as illustrated in FIG. 4, there may be three sales ranking lists. Sales ranking list 408A may represent sales for tires purchased by users of the e-commerce site associated with the interactive computing system 110, sales ranking list 408B may represent sales for tires purchased by owners of a NISSAN 370Z® vehicle, and sales ranking 408C may represent sales for tires purchased by owners of 2010 NISSAN vehicles. As can be seen from the sales ranking lists 408, the parts included in the lists can be numbered based on their sales rank order. Thus, item 1 in sales ranking list 408B is the number one selling tire for NISSAN 370Z vehicle owners. However, as can be seen from the sales ranking list 408A, the tire that is best-selling for NISSAN 370Z vehicle owners is only the second best-selling tires among the entire tire product category. Further, as can be seen from the sales ranking list 408C, the same tire does not rank in the top five for 2010 NISSAN vehicle owners. In some embodiments, although not illustrated in the example of FIG. 4, the sales ranking list can identify the total number of products included in the list. Thus, for example, if 20 tires in the electronic catalog fit NISSAN 370Z vehicles, item 1 in the sales ranking list 408B may state "Sales rank 1 among 20 tires." Similarly, item 3 may state "Sales rank 3 among 20 tires."

Further, the electronic catalog search page 400 may include a part type identifier 410 to indicate the part type for which the user searched and for which sales ranking lists 408 are displayed. In addition, the electronic catalog search page 400 can include a parts type list 412 that includes part types a user can select to view. In the example depicted in FIG. 4, the part type "tires" has been selected in the parts type list 412 as a result of the search the user entered in the search field 406.

In some embodiments, a user can select the sales ranks the user desires to view. In such cases, the user can select from available sales ranks by selecting an entry in the available sales ranks list 414. As illustrated in FIG. 4, the three entries corresponding to the three displayed sales ranking lists 408 have been selected in the available sales ranks list 414.

Although the graphical user interface (GUI) illustrated in FIG. 4 shows five items per sales ranking list 408, a user can select the "show more" button 416 to see additional items, if they exist. Alternatively, or in addition, the GUI can be configured to enable a user to scroll through the list using a scroll bar (not shown).

While FIG. 4 illustrates the sales ranking lists 408 as part of an example electronic catalog search page 400, the present disclosure is not limited as such. The sales ranking lists 408 may be displayed as part of any type of GUI configured to present lists of items to a user. For example, each item for a product category may be listed on a category or browse node page. The browse node page may further include the sales rank for each item in the category. As a second example, one or more sales ranking lists 408 can be presented on an item-detail page for an item a user is viewing. Thus, the user can view alternative items based on one or more sales ranks for the items. Further, the user can view the different sales ranks for the item whose item-detail page the user is viewing. Thus, the user can see, for example, where a particular brake pad ranks for all brake pad sales, brake pad sales for sports cars, brake pad sales for vans, and brake pad sales for cars that exceed a threshold manufacturer's suggested retail price (MSRP) value, etc. In other words, if the user is viewing the item detail page for the tire that is ranked number 3 for NISSAN 370Z vehicle owners, the item-detail page may inform the user that the tire is ranked 3 out of 20 by owners of NISSAN 370Z vehicles. However, if the user's garage 404 indicates that the user owns a TOYOTA CAMRY vehicle instead of a NISSAN 370Z vehicle, the same item may be identified as being ranked, for example, 12 out of 35 assuming the electronic catalog includes 35 tires that fit the TOYOTA CAMRY vehicle and that the tire ranked 3 for NISSAN 370Z vehicle owners also fits a TOYOTA CAMRY vehicle.

In some cases, a user may own multiple cars. In such cases, the item-detail page for a part may indicate the sales ranking for the part for each car that the user owns. Alternatively, or in addition, the item-detail page may indicate the sales ranking for the part among users who own the same combination of cars, or a combination that is related to a threshold degree. For instance, if the user owns a CAMRY vehicle and an ALTIMA vehicle, the item-detail page may show the ranking for a part among users who own a CAMRY vehicle and an ALTIMA vehicle of the same year, among users who own a CAMRY vehicle and an ALTIMA vehicle of the same generation, which may encompass a defined set of model years, and/or among users who own a CAMRY vehicle and an ALTIMA vehicle regardless of the model year of the vehicles. Further, the item-detail page may indicate whether a viewed part fits a car owned by the user.

Additional Embodiments

In some embodiments, the systems and methods disclosed herein can be used to assist users in selecting fitment-specific parts. By generating metrics relating to the popularity of fitment-specific parts by owners of items designed to use the fitment-specific parts, a user can identify which fitment-specific parts are more popular among owners of the same item that the user owns. For instance, the user can determine what the most popular tires are for owners of the same car model as the user. As a second example, the user can determine what speakers are most common among owners of the same television or music-playing electronic device (e.g., digital media player, smartphone, tablet, etc.) as the user.

Some embodiments of processes for assisting users in selecting fitment-specific parts can include a catalog service 130 providing an electronic catalog for presentation to a user. The electronic catalog may provide interactive functionality for users to identify and purchase fitment-specific parts that correspond to specific classes of items. For example, the electronic catalog may provide interactive functionality for users to identify and purchase fitment-specific auto parts that correspond to specific classes of vehicles, or to specific vehicles. In some cases, the electronic catalog provides functionality for a user to specify an item (e.g., a vehicle) and to locate and purchase fitment-specific parts corresponding to the item.

In some cases, purchases made by users from the electronic catalog may be recorded and stored at the user data repository 142. For instance, a server 120 may record a purchase of a fitment-specific part. These recorded or tracked purchases may be captured such that at least some of the purchases are recorded in association with particular items (e.g., vehicles) for which the fitment-specific part is purchased. In some cases, the purchases may be made for fitment-specific parts that fit the same item. In other cases, some of the purchases may be made for fitment-specific parts that fit different items. In some cases, purchases of fitment-specific parts may be recorded without the identity of the particular item for which is was purchased. In such cases, the item may be inferred based on other purchases. Alternatively, the sale may be weighted to not impact the sales rankings or to reduce its impact on the sales rankings. In other cases, the sales ranking for the part may be generated based on its ranking among parts of the same fitment-specific part type regardless of the item for which the part was purchased. For instance, if parts X, Y, and Z fits both vehicles A and B and a purchase of part X is completed, the ranking of part X may be modified among parts X, Y, and Z, without knowing whether the part was purchased for vehicle A or B. In such cases, a user who owns one of vehicle A or B may be presented with the sales ranking of part X.

Based on the recorded purchases, the recommendation system 150 using, for example, the sales rank generator 158, can generate a plurality of popularity metrics for the fitment-specific part. Each of the popularity metrics may correspond to a different respective classification of the items (e.g., vehicles) for which the fitment-specific part has been purchased. The popularity metrics, as previously discussed, can include any metric that relates to the popularity of the fitment-specific parts. Further, the popularity metrics can be based on different corresponding item categories (e.g., vehicle models, vehicle brands, etc.) For example, a popularity metric (e.g., a sales rank) may exist for NISSAN vehicles, for NISSAN ALTIMA vehicles, for TOYOTA vehicles, for TOYOTA CAMRY vehicles, etc. In some cases, the popularity metrics can be based on characteristics of users who purchased the fitment-specific part. For example, a popularity metric, such as a sales rank, may exist for users who purchase the part in a particular geographic location (e.g., the Northeastern portion of the United States of America, or California). Thus, for example, tires may be ranked based on sales by users residing in the particular geographic location. Advantageously, users may determine the popularity of items in regions that tend to have certain weather patterns. For instance, users can see what tires are more popular in snowy areas. Further, item categories may include multiple characteristics enabling users to view a popularity metric for a part based on the multiple characteristics. For instance, a sales rank can be viewed that shows the popularity of parts purchased by people who have a NISSAN ALTIMA vehicle and live in California.

In some embodiments, the recommendation system 150 can present the plurality of popularity metrics to users of the electronic catalog in association with the respective item classifications to which they correspond. Advantageously, in certain embodiments, by presenting the popularity metrics to users, users can assess the popularity of the fitment-specific part among owners of particular classes of items (e.g., classes of vehicles). In some embodiments, recommendations can be generated for users based on one or more of the popularity metrics.

Terminology

A number of computing systems have been described throughout this disclosure. The descriptions of these systems are not intended to limit the teachings or applicability of this disclosure. For example, the recommendation system 150 described herein can generally include any computing device(s), such as desktops, laptops, servers, and distributed computing systems, to name a few. As a second example, the user systems 102 can generally include any computing device(s), such as desktops, laptops, servers, video game platforms, television set-top boxes, televisions (e.g., internet TVs), computerized appliances, and wireless mobile devices (e.g. smart phones, PDAs, tablets, electronic book readers, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the recommendation system 150 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, operation, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A computer implemented method, performed by a computer system comprising computer hardware, of generating vehicle-specific part popularity metric rankings, the computer implemented method comprising:
   under control of one or more computing devices configured with specific computer-executable instructions,
      identifying, based on a first user input received via a user interface provided on a computing device of a user, a vehicle part type to rank for the user based at least partially on an indicated interest in the vehicle part type by the user;
      identifying, based on a second user input received via the user interface, a first vehicle associated with the user;
      determining a first item category based at least partially on the first vehicle, the first item category associated with one or more first conditions for determining whether a vehicle part is a member of the first item category;
      identifying a first group of vehicle parts of the vehicle part type that satisfies the one or more first conditions associated with the first item category, each vehicle part in the first group compatible with the first vehicle;
      causing a first popularity metric ranking of the vehicle parts in the first group to be presented to the user via the user interface, the first popularity metric ranking generated based on a first subset of transactions associated with the one or more first conditions, wherein the transactions in the first subset are weighted based on recentness of the transactions such that a first transaction in the first subset associated with a first transaction time is weighted more heavily in the generation of the first popularity metric ranking than a second transaction in the first subset associated with a second transaction time that precedes the first transaction time;
   determining a second item category based at least partially on the first vehicle, the second item category associated with one or more second conditions for determining whether a vehicle part is a member of the second item category;
   identifying a second group of vehicle parts of the vehicle part type that satisfies the one or more second conditions associated with the second item category, each vehicle part in the second group compatible with the first vehicle; and
   causing a second popularity metric ranking of the vehicle parts in the second group to be presented to the user via the user interface such that the second popularity metric ranking is visible to the user along with the first popularity metric ranking, the second popularity metric ranking different from the first popularity metric ranking and generated based on a second subset of transactions associated with the one or more second conditions, wherein the transactions in the second subset are weighted based on recentness of the transactions such that a third transaction in the second subset associated with a third transaction time is weighted more heavily in the generation of the second popularity metric ranking than a fourth transaction in the second subset associated with a fourth transaction time that precedes the third transaction time.

2. The computer-implemented method of claim 1, further comprising causing a first list of top selling vehicle parts of the vehicle part type to be presented to the user based at least partially on the first popularity metric ranking, and causing a second list of top selling vehicle parts of the vehicle part type to be presented to the user based at least partially on the second popularity metric ranking, wherein the first list includes at least one vehicle part that is not included in the second list.

3. The computer-implemented method of claim 2, wherein a first vehicle part listed in a highest position of the first list is different from a second vehicle part listed in a highest position of the second list.

4. The computer-implemented method of claim 1, wherein at least some of the vehicle parts of the vehicle part type that are members of the second item category are members of the first item category.

5. The computer-implemented method of claim 1, further comprising:
   identifying an item detail page for a vehicle part viewed by the user; and
   determining the vehicle part type of the vehicle part.

6. A system comprising:
   a data store configured to store item category information; and
   one or more computing devices in communication with the data store and configured to at least:
      identify a first item associated with a user, wherein the first item is compatible with at least some part models of a part type;
      determine a first item category based at least partially on the first item, the first item category associated with one or more first conditions for determining whether a part model is a member of the first item category;
      identify a first group of part models of the part type that satisfies the one or more first conditions associated with the first item category, each part model in the first group compatible with the first item;

output a first popularity metric ranking of the part models in the first group for presentation to the user, the first popularity metric ranking generated based on a first subset of transactions, each transaction in the first subset associated with the one or more first conditions, wherein the transactions in the first subset are weighted based on recentness of the transactions such that a first transaction in the first subset associated with a first transaction time is weighted more heavily in the generation of the first popularity metric ranking than a second transaction in the first subset associated with a second transaction time that precedes the first transaction time;

determine a second item category based at least partially on the first item, the second item category associated with one or more second conditions for determining whether a part model is a member of the second item category;

identify a second group of part models of the part type that satisfies the one or more conditions associated with the second item category, each part model in the second group compatible with the first item; and output a second popularity metric ranking of the part models in the second group for presentation to the user, the second popularity metric ranking generated based on a second subset of transactions and different from the first popularity metric ranking, each transaction in the second subset associated with the one or more second conditions, wherein the transactions in the second subset are weighted based on recentness of the transactions such that a third transaction in the second subset associated with a third transaction time is weighted more heavily in the generation of the second popularity metric ranking than a fourth transaction in the second subset associated with a fourth transaction time that precedes the third transaction time.

7. The system of claim 6, wherein the one or more computing devices are further configured to generate a first sales ranking of the part models in the first group and a second sales ranking of the part models in the second group.

8. The system of claim 6, wherein the one or more computing devices are further configured to cause a first list of popular part models of the part type to be presented to the user based at least partially on the first popularity metric ranking, and to cause a second list of popular part models of the part type to be presented to the user based at least partially on the second popularity metric ranking, wherein the first list includes at least one part model that is not included in the second list.

9. The system of claim 8, wherein a first part model listed in a highest position of the first list is different from a second vehicle part listed in a highest position of the second list.

10. The system of claim 8, wherein the first list includes at least one part model that is included in the second list.

11. The system of claim 6, wherein the one or more computing devices are further configured to:
identify the occurrence of a popularity metric action of an instance of a part model;
identify one or more item categories associated with the part model; and
update a popularity metric ranking for each item category associated with the part model.

12. The system of claim 6, wherein the one or more computing devices are further configured to update the first popularity metric ranking every time period based at least partially on popularity metric actions of the part models of the part type that are members of the first item category that occur during the time period and to update the second popularity metric ranking every time period based at least partially on popularity metric actions of the part models of the part type that are members of the second item category that occur during the time period.

13. Non-transitory physical computer storage comprising computer-executable instructions that, when executed by a computing system, cause the computing system to:
identify a first item;
determine a first item category based at least partially on the first item, the first item category associated with one or more first conditions for determining whether a part model is a member of the first item category;
identify a first group of part models of a part type that satisfies the one or more first conditions associated with the first item category, each part model in the first group compatible with the first item;
output a first popularity metric ranking of the part models in the first group for presentation to a user, the first popularity metric ranking generated based on a first subset of transactions associated with the one or more first conditions, wherein the transactions in the first subset are weighted based on recentness of the transactions such that a first transaction in the first subset associated with a first transaction time is weighted more heavily in the generation of the first popularity metric ranking than a second transaction in the first subset associated with a second transaction time that precedes the first transaction time;
determine a second item category based at least partially on the first item, the second item category associated with one or more second conditions for determining whether a part model is a member of the second item category;
identify a second group of part models of the part type that satisfies the one or more conditions associated with the second item category, each part model in the second group compatible with the first item; and
output a second popularity metric ranking of the part models in the second group for presentation to the user, the second popularity metric ranking different from the first popularity metric ranking and generated based on a second subset of transactions associated with the one or more second conditions, wherein the transactions in the second subset are weighted based on recentness of the transactions such that a third transaction in the second subset associated with a third transaction time is weighted more heavily in the generation of the second popularity metric ranking than a fourth transaction in the second subset associated with a fourth transaction time that precedes the third transaction time.

14. The non-transitory physical computer storage of claim 13, wherein the instructions further cause the computing system to cause a first list of top selling part models of the part type to be presented to the user based at least partially on the first popularity metric ranking, and to cause a second list of top selling part models of the part type to be presented to the user based at least partially on the second popularity metric ranking, wherein the first list includes at least one part model that is not included in the second list.

15. The non-transitory physical computer storage of claim 13, wherein the instructions further cause the computing system to identify a geographic location of the user, and to determine the item category based at least partially on the first item and the geographic location of the user.

16. The non-transitory physical computer storage of claim 13, wherein the instructions further cause the computing system to exclude transactions of the part models of the part type for part models that are not members of the first item category from the first subset of transactions, and to exclude transactions of the part models of the part type for part models that are not members of the second item category from the second subset of transactions.

17. The non-transitory physical computer storage of claim 13, wherein the instructions further cause the computing system to:
    receive indication of a sale of a part of the part type;
    identify one or more item categories for the part; and
    update one or more sales rankings for each item category associated with the part.

18. The non-transitory physical computer storage of claim 13, wherein the first item is associated with the user, wherein the instructions further cause the computing system to identify a second item associated with the user.

19. The non-transitory physical computer storage of claim 18, wherein the instructions further cause the computing system to determine the first item category based at least partially on the first item and the second item, and to determine the second item category based at least partially on the first item and the second item.

20. The non-transitory physical computer storage of claim 18, wherein the instructions further cause the computing system to identify a characteristic shared by the first item and the second item, and to determine each of the first and second item categories based at least partially on the characteristic shared by the first item and the second item.

21. The non-transitory physical computer storage of claim 13, wherein the first item is associated with the user by one of an ownership relationship, a partial ownership relationship, a lease relationship, or a rental relationship.

22. A method performed by a computer system comprising computer hardware, the method comprising:
    providing an electronic catalog that provides interactive functionality for users to purchase fitment-specific auto parts that correspond to specific classes of vehicles, said electronic catalog providing functionality for a user to specify a vehicle and to purchase fitment-specific parts corresponding to the vehicle;
    recording purchases made by users from the electronic catalog of a fitment-specific part such that at least some of the purchases are recorded in association with particular vehicles for which the fitment-specific part is purchased, wherein at least some of the purchases are for different vehicles than other purchases;
    generating, based at least partially on a plurality of subsets of the recorded purchases, a plurality of popularity metrics for the fitment-specific part, each popularity metric corresponding to a different respective classification of the vehicles for which the fitment-specific part has been purchased, the plurality of subsets comprising a first subset of recorded purchases associated with a first vehicle classification and a second subset of recorded purchases associated with a second vehicle classification different from the first vehicle classification, wherein the recorded purchases in the plurality of subsets are weighted based on recentness of the recorded purchases such that a first recorded purchase associated with a first time is weighted more heavily in the generation of the plurality of popularity metrics than a second recorded purchase associated with a second time that precedes the first time; and
    exposing the plurality of popularity metrics to a user of the electronic catalog in association with the respective vehicle classifications comprising at least the first and second vehicle classifications, the first and second vehicle classifications corresponding to a particular class of vehicles associated with the user, such that the user can assess the popularity of the fitment-specific part among other owners of the particular class of vehicles.

23. The method of claim 22, wherein the popularity metrics are sales ranks of the fitment-specific part, each sales rank corresponding to a different respective vehicle classification.

24. The method of claim 22, wherein each popularity metric corresponds to, and is based at least partially on purchases made by, a different respective segment of the users who purchased the fitment-specific part.

25. The method of claim 22, wherein at least one of said classifications of vehicles is a sub-classification of another of said classifications.

26. The method of claim 22, further comprising personalizing an electronic catalog page for the user with two or more popularity metrics corresponding to a vehicle owned by the user.

* * * * *